United States Patent [19]

Mabire

[11] Patent Number: 5,284,635
[45] Date of Patent: Feb. 8, 1994

[54] PROCESS FOR THE ELIMINATION OF HYDROGEN SULFIDE BY USING WATER-IN-OIL EMULSIONS

[75] Inventor: Frédéric Mabire, Arcueil, France

[73] Assignee: Societe Francaise Hoechst, Puteaux, France

[21] Appl. No.: 8,463

[22] Filed: Jan. 25, 1993

Related U.S. Application Data

[62] Division of Ser. No. 577,669, Sep. 5, 1990, Pat. No. 5,223,175.

[30] Foreign Application Priority Data

Sep. 5, 1989 [FR] France ................... 89 11586

[51] Int. Cl.$^5$ ................... C01B 17/16
[52] U.S. Cl. ................... 423/226; 423/242.2; 423/243.01; 423/573.1; 423/576.7; 44/624; 208/208 R; 208/240
[58] Field of Search ............. 423/226, 242.2, 243.01, 423/573.1, 576.7; 208/240, 209, 208 R; 44/624; 210/749

[56] References Cited

U.S. PATENT DOCUMENTS

| | | | |
|---|---|---|---|
| 2,606,873 | 8/1952 | Cardwell et al. | 252/148 |
| 2,629,696 | 7/1953 | Dodd et al. | 252/309 X |
| 2,955,144 | 10/1960 | Sisco et al. | 208/240 X |
| 3,077,454 | 2/1963 | Monroe et al. | 252/392 X |
| 3,163,593 | 12/1964 | Webster et al. | 208/240 |
| 3,831,348 | 8/1974 | Pap | 55/73 |
| 4,012,329 | 3/1977 | Hayes et al. | 252/308 X |
| 4,014,785 | 3/1977 | Li et al. | 210/643 X |
| 4,220,550 | 9/1980 | Frenier et al. | 252/180 |
| 4,310,435 | 1/1982 | Frenier | 252/180 |
| 4,337,225 | 6/1982 | Dines | 210/638 X |
| 4,360,448 | 11/1982 | Li et al. | 252/309 |
| 4,680,127 | 7/1987 | Edmondson | 210/749 |
| 4,746,420 | 5/1988 | Darian et al. | 208/222 |
| 4,909,925 | 3/1990 | Hudgson et al. | 208/189 |
| 5,085,842 | 2/1992 | Porz et al. | 423/226 |
| 5,128,049 | 7/1992 | Gatlin | 473/226 X |
| 5,152,916 | 10/1992 | Hoffmann et al. | 252/189 |

FOREIGN PATENT DOCUMENTS

| | | | |
|---|---|---|---|
| 631527 | 11/1961 | Canada | 208/240 |
| 0012478 | 12/1978 | European Pat. Off. | |
| 2185994 | 8/1987 | United Kingdom | 208/240 |

OTHER PUBLICATIONS

Hackh's Chemical Dictionary, 4th ed., (1984, McGraw-Hill Book Co.) pp. 303-304 Chemical Abstracts, CA115(10)95451c.

Primary Examiner—Gary P. Straub
Assistant Examiner—Timothy C. Vanoy
Attorney, Agent, or Firm—Browdy and Neimark

[57] ABSTRACT

A process for the removal of hydrogen sulfide present in a composition comprising treating the composition with a water-in-oil emulsion wherein said water-in-oil emulsion containing by weight about: 20 to 80% of a dispersed aqueous phase containing about 20 to 70% of one or more aldehydes chosen from the group constituted by formaldehyde, glyoxal, glutaraldehyde, glycolaldehyde or glyoxylic acid and 80 to 30% of an aqueous solution containing 90 to 100% water and 10 to 0% of a buffer agent pH=5.5±1.5; and 80 to 20% of a continuous oil phase containing about 90 to 99% of one or more saturated and liquid $C_6$–$C_{16}$ hydrocarbons, and 10 to 1% of an emulsifying system constituted by one or more water-in-oil emulsifying agents.

15 Claims, No Drawings

PROCESS FOR THE ELIMINATION OF HYDROGEN SULFIDE BY USING WATER-IN-OIL EMULSIONS

This is a division of copending parent application Ser. No. 07/577,669, filed 05 Sep. 1990, which has issued as U.S. Pat. No. 5,223,175.

The present invention relates to new water in oil emulsions and their use for the elimination of hydrogen sulphide.

Fossil products and notably crude oil, often contain significant quantities of hydrogen sulphide, $H_2S$, which it is desirable to eliminate as quickly as possible for it is a toxic, corrosive, inflammable and explosive gas.

It is known to be possible to reduce the hydrogen sulphide content present in aqueous mediums by using aqueous solutions of aldehydes such as formaldehyde, glyoxal, glutaraldehyde (see for example the U.S. Pat. No. 4,680,127 as well as the references cited in the same document). However, these products take effect slowly even in high proportions. This is therefore a major drawback to their use, notably for the treatment of crude oil on offshore platforms.

It has now been discovered with astonishment, new compositions obviating these inconveniences.

The compositions according to the present invention are characterized in that they are water-in-oil emulsions containing, by weight, about:
- 20 to 80% of a dispersed aqueous phase containing about 20 to 70% of one or more aldehydes chosen from the group constituted by formaldehyde, glyoxal, glutaraldehyde, glycolaldehyde or glyoxylic acid and 80 to 30% of an aqueous solution containing 90 to 100% water and 0 to 10% of a buffer agent to provide a pH=$5.5 \pm 1.5$ and
- 80 to 20% of a continuous oil phase containing about 90 to 99% of one or more saturated and liquid $C_6$–$C_{16}$ hydrocarbons, and 10 to 1% of an emulsifying system constituted by one or more water-in-oil emulsifying agents.

In the present description, oil-in-water emulsifying agent refers to any conventional water-in-oil emulsifying agent, such as sorbitan monostearate, sorbitan monooleate, sorbitan sesquioleate and substances with so-called weak hydrophilic/lipophilic balance which are all discussed in the literature and which are cited notably in the Kirk-Othmer Encyclopaedia of Chemical Technology, 3rd edition, volume 8, pages 910–916.

The saturated or liquid $C_6$–$C_{16}$ hydrocarbons can be chosen form the straight chain or branched $C_6$–$C_{16}$ alkanes and $C_6$–$C_{16}$ cycloalkanes optionally substituted by one or more linear or branched alkyl groups preferably containing from 1 to 5 carbon atoms. Preferentially, a paraffin solvent with a $C_{10}$–$C_{13}$ linear chain with a boiling point comprised between 180° and 270° C. is used.

Any conventional buffer agents to provide a pH=$5.5 \pm 1.5$ can be used such as those described in the literature such as the following pairs: acetic acid—sodium acetate, potassium phosphate—sodium citrate, potassium dihydrogen phosphate—disodium hydrogen phosphate, citric acid—disodium hydrogen phosphate. Preferentially, an acetic acid—sodium acetate buffer agent pH=5.5 is used.

More particularly a subject of the invention is the compositions as defined above, characterized in that the aldehyde is glyoxal.

Notably a subject of the invention is the compositions according to the present invention in the form of water in oil emulsions, containing by weight:
- $60 \pm 5$% of a dispersed aqueous phase buffered to pH=5.5 with the acetic acid—sodium acetate pair and containing 40 to 50% glyoxal,
- $40 \pm 5$% of a continuous oil phase containing 93 to 98% of a saturated and liquid $C_{10}$–$C_{13}$ hydrocarbons mixture and 7 to 2% of an emulsifying system constituted by one or more water in oil emulsifying agents.

Among these compositions, there can be cited more particularly a composition in the form of a water-in-oil emulsion containing by weight:
- 60% of an aqueous phase buffered to pH 5.5 and containing about 40% glyoxal,
- 40% of an oil phase constituted by approximately 95% of a paraffin solvent with a $C_{10}$–$C_{13}$ linear chain with a boiling point comprised between 180° and 270° C. and 5% sorbitan sesquioleate.

According to the invention, the compositions cited above can be prepared by a process characterized in that the aqueous solution, optionally buffered to the pH desired, of the chosen aldehyde (or aldehydes) is emulsified in a conventional manner, at ambient temperature, in the oil phase containing in solution the chosen emulsifying agent or agents.

The compositions according to the present invention are endowed with useful properties for the elimination of hydrogen sulphide present in various fluids and notably they are particularly effective at eliminating the hydrogen sulphide present in crude oils which can exist in the form of water in oil or oil in water emulsions. These properties justify the use of the compositions according to the present invention in a process for the elimination of hydrogen sulphide present in a fluid whether liquid or gas, the process characterized in that this fluid is treated with a composition according to the present invention.

In the preferred conditions for implementing the invention, the process described above is carried out at ambient temperature, either by simple mixing of the fluid with the composition of the invention, when it is a liquid, or by bubbling the fluid through the composition of the invention when it is a gas.

The following examples illustrate the present invention without however limiting it.

The hydrogen sulphide content has been determined by potentiometric determination using a silver electrode, according to the following procedure:

The following are mixed together at ambient temperature:
- 100 ml of acetone,
- 20 ml of isopropyl alcohol,
- 5 ml of a 20% aqueous solution of ammonium nitrate.

Then, a 50 ml of a sample to be determined, previously de-oxygenated by bubbling nitrogen through it is introduced into this solution which has been carefully de-oxygenated by bubbling nitrogen through it. The reaction medium obtained is then determined under agitation, in an inert atmosphere, with an aqueous solution of 0.1N silver nitrate, by following the curve of the potential of the mixture as a function of the volume, V, of the sodium nitrate solution introduced, using a potentiometer equipped with a silver measuring electrode and a reference electrode, Ag/AgCl, the external electrolyte of which is an ethanolic solution saturated with ammonium nitrate. At the balance point, the concentration of hydrogen sulphide of the sample, expressed in mg/l, is obtained from the equation (1):

$$[H_2S] \, mg/l = \sigma \times \frac{32 \times 0.1 \times 1000}{50} = 64\sigma$$

EXAMPLE 1

Using a turbine turning at a speed of 10,000 revolutions per minute, 600 g of an aqueous solution of glyoxal at 40% by weight is emulsified at ambient temperature in a mixture of 380 g of normal $C_{10}$–$C_{13}$ alkanes having a boiling point comprised between 180° and 270° C. and 20 g of sorbitan sesquioleate. Thus 1 kg of a water-in-oil emulsion is obtained containing, by weight, 38% oil, 36% water, 24% glyoxal and 2% emulsifying agent and having at 20° C., a density of 1.05 and a Brookfield viscosity of 240 mPa.s (speed 20 revs/min., axis 2). This composition contains 4.135 moles of glyoxal, being 4.135 mmoles per gram.

EXAMPLE 2

Using a turbine turning at a speed of 10,000 revolutions per minute, 600 g of an aqueous solution containing 240 g (4.135 moles) of glyoxal, 6 g of acetic acid and 6 g of anhydrous sodium acetate and having a pH of 5.5 is emulsified at ambient temperature in a mixture of 380 g of normal $C_{10}$–$C_{13}$ alkanes having a boiling point comprised between 180° and 270° C. and 20 g of sorbitan sesquioleate. Thus 1 kg of a water-in-oil emulsion is obtained containing, by weight, 38% oil, 34.8% water, 24% glyoxal, 2% emulsifying agent and 1.2% of buffer, having at 20° C., a density of 1.05 and a Brookfield viscosity of 260 mPa.s (speed 20 revs/min., axis 2). This composition contains 4.135 mmoles of glyoxal per gram.

EXAMPLE 3

One liter of light crude oil from a production well in the North Sea and containing 253 mg/l, being 7.42 mmoles/l of hydrogen sulphide, is treated under agitation, at ambient temperature, with either 2 g of a commercially available aqueous solution of glyoxal at 40% by weight, designated A, or 0.5 g or 2 g of the composition described in Example 1, designated Ex 1, and the percentage of hydrogen sulphide eliminated as a function of time expressed in minutes, is followed by potentiometric determination.

The results obtained are given in table 1 in which R represents the hydrogen sulphide/glyoxal molar ratio.

TABLE 1

| | Proportions | | |
|---|---|---|---|
| | A | Ex 1 | |
| Time | | R | |
| in minutes | 0.54 | 3.59 | 0.89 |
| 0 | 0 | 0 | 0 |
| 5 | 9 | 23 | 42 |
| 15 | 22 | 47 | 72 |
| 30 | 31 | 52 | 83 |
| 60 | 48 | 61 | 92 |

At the proportion of 2 g/l, the composition according to the invention allows the virtual total elimination of hydrogen sulphide over 60 minutes whilst the aqueous solution of glyoxal A, containing 1.66 times more glyoxal, eliminates only half of this in the same time. The composition according to the present invention is therefore clearly more effective than an aqueous solution of glyoxal of the prior art.

EXAMPLE 4

One liter of light crude oil from a production well in the North Sea and containing 209 mg/l, being 6.13 mmoles/l of hydrogen sulphide, is treated under agitation, at ambient temperature, with either 2 g of a commercially available aqueous solution of glyoxal at 40% by weight, designated A, or 2 g of an aqueous solution of glyoxal buffered at pH=5.5, containing, by weight, 58% water, 40% glyoxal and 2% of a 50/50 mixture of acetic acid—anhydrous sodium acetate, designated B, or 0.5 g or 2 g of the composition according to Example 2, designated Ex 2, and the percentage of hydrogen sulphide eliminated as a function of time is followed.

The results obtained are given in table II, in which R represents the hydrogen sulphide/glyoxal molar ratio.

TABLE II

| | Proportions | | | |
|---|---|---|---|---|
| | A | B | Ex 2 | |
| | 2 g/l | 2 g/l | 0.5 g/l | 2 g/l |
| Time | | | R | |
| in minutes | 0.444 | 0.444 | 2.96 | 0.74 |
| 0 | 0 | 0 | 0 | 0 |
| 5 | 8 | 12 | 28 | 94 |
| 15 | 24 | 41 | 49 | 97 |
| 30 | 37 | 65 | 55 | 98 |
| 60 | 49 | 85 | 65 | 100 |

On reading this table, it is noticed that the buffered compositions according to the present invention are particularly effective.

EXAMPLE 5

One liter of a water-in-oil emulsion from an oil well in the Parisian region, containing by weight 70% oil, 30% water and 241 mg/l, being 7.07 mmoles/l, of hydrogen sulphide is treated under agitation, at ambient temperature with 2 g either of a commercially available aqueous solution of glyoxal at 40% by weight, or with the composition of Example 2 and the percentage of hydrogen sulphide eliminated as a function of time is followed as in the previous examples.

The results obtained are listed in table III in which R represents the hydrogen sulphide/glyoxal molar ratio.

TABLE III

| | Proportions | |
|---|---|---|
| | A | Ex 2 |
| | 2 g/l | 2 g/l |
| Time | | R |
| in minutes | 0.51 | 0.85 |
| 0 | 0 | 0 |
| 1 | 0 | 72 |
| 5 | 10 | 87 |
| 15 | 19 | 89 |
| 30 | 30 | 90 |
| 60 | 45 | 95 |

These results show the high efficiency of the compositions of the present invention in eliminating the hydrogen sulphide present in a water-in-oil emulsion.

EXAMPLE 6

Using the operating method of Example 1, a water-in-oil emulsion is prepared containing, by weight, 38% oil, 37.8% water, 22.2% formaldehyde and 2% sorbitan sesquioleate starting from an aqueous solution of formaldehyde at 37% by weight and normal $C_{10}$–$C_{13}$ alkanes. The emulsion obtained has a density at 20° C. of 0.95 and a Brookfield viscosity of 55 mPa.s determined at 20° C. at the speed of 20 revs/min. with axis 1.

EXAMPLE 7

Similarly, using the operating method described in Example 1, a water-in-oil emulsion is prepared containing, by weight, 38% oil, 30% glyoxylic acid, 30% water and 2% sorbitan sesquioleate starting from a commercially available aqueous solution of 50% glyoxylic acid and normal $C_{10}$–$C_{13}$ alkanes. The emulsion obtained has a density at 20° C. of 1.07 and a Brookfield viscosity of 105 mPa.s determined at 20° C. at the speed of 20 revs/min. with axis 2.

EXAMPLE 8

The effectiveness of the emulsion obtained in Example 6 was compared with that of a commercially available aqueous solution of formaldehyde at 37% by weight, designated C, in the proportion of 2 g/l, on a light crude oil from a production well in the North Sea containing 234 mg/l of $H_2S$. The results obtained are listed in table IV.

EXAMPLE 9

Similarly the effectiveness of the emulsion obtained in Example 7 was compared to that of a commercially available aqueous solution of glyoxylic acid at 50% by weight, designated D, in the proportion of 2 g/l on the same light crude oil used in Example 8. The results obtained are given in table IV.

TABLE IV

Percentages of the elimination of $H_2S$ as a function of time.

| Time in minutes | Products | | | |
|---|---|---|---|---|
| | Ex. 6 | C | Ex. 7 | D |
| 0 | 0 | 0 | 0 | 0 |
| 5 | 25 | 5 | 6 | 5 |
| 15 | 39 | 14 | 18 | 17 |
| 30 | 71 | 24 | 24 | 21 |
| 60 | 87 | 33 | 38 | 32 |

It is noted that the compositions according to the present invention are more efficient than the aqueous solution of glyoxylic acid or of the formaldehyde used for their preparation.

I claim:

1. A process for the removal of hydrogen sulphide present in a composition comprising treating said composition with a water-in-oil emulsion,
   wherein said emulsion comprises about:
   20–80% by weight of a dispersed aqueous solution comprising about 20 to 70% by weight of an aldehyde selected from the group consisting glyoxal, formaldehyde, glutaraldehyde, glycolaldehyde and glyoxylic acid, and about 80 to 30% by weight of water and at least one of acetic acid or sodium acetate in a quantity sufficient to provide a buffered pH of 5.5±1.5 and,
   80 to 20% by weight of a continuous oil phase comprising about 90 to 99% by weight of one or more saturated and liquid $C_6$–$C_{16}$ hydrocarbons, and about 10 to 1% by weight of an emulsifying system comprising one or more water-in-oil emulsifying agents.

2. A process according to claim 1, wherein said aldehyde is glyoxal.

3. A process according to claim 1, wherein said emulsion comprises,
   60±5% by weight of a dispersed aqueous solution comprising about 40 to 50% by weight of glyoxal, about 60 to 50% by weight of water and at least one of acetic acid or sodium acetate in a quantity sufficient to provide a buffered pH of about 5.5 and,
   40%±5% by weight of a continuous oil phase comprising about 93 to 98% by weight of one or more saturated and liquid $C_{10}$–$C_{13}$ hydrocarbons, and about 7 to 2% by weight of an emulsifying system comprising one or more water-in-oil emulsifying agents.

4. A process according to claim 3, wherein said emulsion comprises, about
   60% by weight of a dispersed aqueous solution comprising about 40% by weight of glyoxal and about 60% by weight of water and at least one of acetic acid or sodium acetate in a quantity sufficient to provide a buffered pH of about 5.5 and,
   40% by weight of a continuous oil phase comprising about 95% by weight of a paraffin solvent with a $C_{10}$–$C_{13}$ linear chain with a boiling point between 180° and 270° C. and 5% sorbitan sesquinoleate.

5. A process according to claim 3, wherein said composition being treated is a gas.

6. A process according to claim 5, wherein said treating comprises bubbling said gas through said emulsion.

7. A process according to claim 3, wherein said composition being treated is a liquid.

8. A process according to claim 7, wherein said treating comprises mixing said liquid with said emulsion.

9. A process according to claim 3, wherein said composition being treated is a solid.

10. A process according to claim 1, wherein said composition being treated is a gas.

11. A process according to claim 10, wherein said treating comprises bubbling said gas through said emulsion.

12. A process according to claim 1, wherein said composition being treated is a liquid.

13. A process according to claim 12, wherein said treating comprises mixing said liquid with said emulsion.

14. A process according to claim 1, wherein said composition being treated is a solid.

15. A process according to claim 1, wherein said aldehyde is glyoxal.

* * * * *